UNITED STATES PATENT OFFICE.

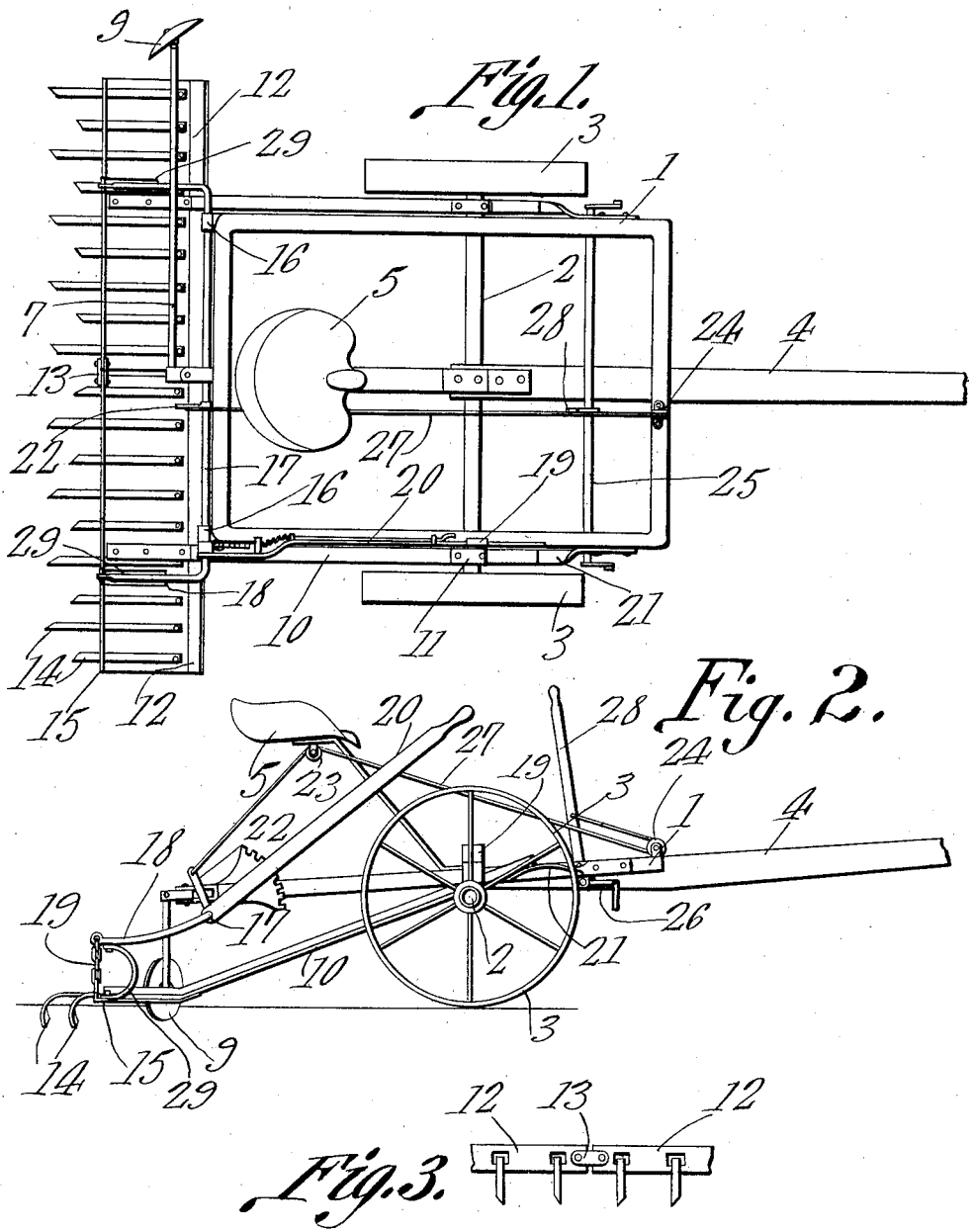

JOHN B. BUNTEN, OF MOUNT AUBURN, IOWA.

HARROW ATTACHMENT FOR PLANTERS AND THE LIKE.

1,057,033.    Specification of Letters Patent.    Patented Mar. 25, 1913.

Application filed April 14, 1911, Serial No. 621,078. Renewed August 21, 1912. Serial No. 716,317.

*To all whom it may concern:*

Be it known that I, JOHN B. BUNTEN, a citizen of the United States, residing at Mount Auburn, in the county of Benton and State of Iowa, have invented a new and useful Harrow Attachment for Planters and the Like, of which the following is a specification.

This invention has relation to attachments adapted to be applied to the frames of planters and like agricultural machines, and consists in the novel construction and arrangement of its parts as hereinafter shown and described.

The object of the invention is to provide a harrow structure of simple arrangement which may be easily and quickly applied to a wheel-mounted frame, and which is provided with lever mechanism adapted to be used for raising the harrow sections. When the attachment is applied to a planter the said lever mechanism also serves as means for raising or lowering the marker of the planter.

In the accompanying drawings:—Figure 1 is a top plan view of the harrow applied to the frame of a planter. Fig. 2 is a side elevation of the same. Fig. 3 is a rear end view of a portion of the harrow.

Inasmuch as Figs. 1 and 2 illustrate the harrow applied to a wheel-mounted frame, a description of so much of the said frame as is necessary to understand the construction and operation of the harrow will be given. Preferably, this is the frame of a planter, but it is to be understood that the attachment can be applied to any wheel-mounted frame. As illustrated in the drawings, the frame 1 is mounted upon an axle 2 which in turn is supported upon a ground wheel 3. A draft tongue 4 is attached to the frame 1 and an operator's seat 5 is mounted upon the said tongue or part of the frame 1. A marker staff 7 is pivotally connected with the rear side of the frame 1 in the usual manner and carries at its outer end a disk marker 9. Any other form of marker may be employed at the outer end of the staff 7.

The harrow attachment comprises arms 10 provided at their forward ends with bearings 11 which loosely receive the end portions of the axle 2 of the wheel mounted frame. Harrow sections 12 are fixed to the rear ends of the arms 10 and the inner ends of the harrow sections 12 are pivotally connected together by links 13 which are pivoted at their opposite ends to the adjacent harrow section 12. Harrow teeth 14 of any desired pattern are carried by the sections 12 and project rearwardly through perforations provided in upstanding flanges 15 carried at the rear ends of the said harrow sections. The teeth 14 are secured at their forward ends to the intermediate portions of the harrow sections 12. Bearings 16 are mounted upon the rear portion of the frame 1 and a shaft 17 is journaled in the said bearings 16. The shaft 17 is provided at its ends with crank extremities 18 and chains 19 connect the said crank extremities 18 with the harrow sections 12 at points intermediate the ends of the said sections. One crank extremity 18 is thus connected to one harrow section 12 and each harrow section is connected to one crank extremity 18 of the shaft 17. A catch 19 is mounted upon the frame 1 and a lever 20 is fixed at one end to the intermediate portion of the shaft 17 and at times is adapted to be engaged and held against movement by the catch 19.

The parts of the harrow attachment are so arranged that when the bearings 11 carried by the arms 10 receive the end portions of the axle 2, the harrow sections 12 trail behind the frame 1 and the teeth 14 are normally in contact with the surface of the ground. When in this position the crank extremities 18 of the shaft 17 are rearwardly disposed and one of the said extremities 18 lies under the marker staff 7, and the said staff is in engagement with that extremity 18 over which it is transversely disposed. Therefore when the upper end of the lever 20 is swung in a forward direction and its free end portion is engaged with the catch 19 the shaft 17 is partially rotated in the bearings 16 and the extremities 18 are swung in an upward direction. This movement upon the part of the crank extremities 18 moves the chain longitudinally, which in turn lifts the harrow section 12 and that crank extremity 18 of the shaft 17 which is under the marker staff 7 engages the said staff and swings the same so that the marker 9 is elevated above the surface of the ground. Thus the harrow sections and the marker staff may be moved vertically at the end of a row in order that the machine may be readily turned around. When the harrow sections are lowered and the teeth 14 are in contact with the surface of the ground, and as the wheel-mounted frame passes over the ground, the said sections may ride over the surface and by reason of the fact that the sections are connected together at their inner ends by the links 13 there is sufficient flexibility to permit the sections to assume different angles with relation to each other in order that they may pass freely over the surface of the ground without unnecessary jarring or lifting. Again, by reason of the fact that the arms 10 are pivotally connected at their forward ends with the axle 2 and the extremities 18 of the shaft 9 are connected with the rear portions of the harrow sections, the said shaft 17 may be turned by using the lever 20 with a minimum exertion of energy and the harrow sections may be readily lifted above the surface of the ground.

The forward portions of the arms 10 are extended forwardly in advance of the axle 2 and springs 21 are fixed at their forward ends to the sides of the frame 1 and at their rear ends bear against the under sides of the forwardly projecting portions of the arms 10. The said springs 21 are under tension with a tendency to hold the rear ends of the arms 10 in a downward direction and thus the teeth 14 are resiliently held in contact with the ground.

An arm 22 is fixed to the intermediate portion of the shaft 17 a pulley 23 is journaled under the seat 5 and a pulley 24 is journaled at the forward portion of the frame 1. A shaft 25 is journaled at the forward portion of the frame 1 and is provided at its ends with arms 26 which may be connected with the hopper frame of the planter not shown. A cable 27 is connected at one end with the arm 22 and is trained over the pulley 23 and around the pulley 24 and is connected at its other end with a lever 28 fixed to the intermediate portion of the shaft 25. Therefore it will be seen that when the lever 28 is swung so that the hopper frame is raised or lowered the cable 27 will be moved longitudinally and the arm 22 will be swung about the axis of the shaft 17 and the extremities 18 of the said shaft will be moved in an upward direction at the same time that the hopper frame of the planter is elevated. Therefore when the machine arrives at the end of a row and the hopper frame is elevated in order that the machine may be turned around the earth engaging members 14 are simultaneously raised.

In order that the harrow sections may be yieldingly pressed downward under all conditions, springs 29 are interposed between said sections and the extremities of the arms 18.

Having described the invention what I claim as new and desire to secure by Letters Patent is:—

1. In combination with a wheel-mounted planter frame provided with an axle and having a pivoted marker staff, a harrow attachment comprising arms having bearings which pivotally receive the axle, harrow sections attached to said arms, means pivotally connecting the inner ends of the harrow sections together, bearings provided upon the frame, a shaft journaled in said bearings and having crank extremities, flexible members connecting the crank extremities of the shafts with the harrow sections, the crank extremities of the shaft being at lower elevations than the staff of the marker which lies transversely across one or the other of the said shaft cranks, and a catch mounted upon the frame, and a lever fixed to the intermediate portion of the shaft and adapted to be engaged and retained by the said catch.

2. A harrow including a wheel supported frame, flat bottomed sections, flexible connections between the sections, pivotal connections between the sections and the frame, an upstanding flange upon the rear portion of each section and having apertures, harrow teeth secured upon the bottoms of the sections and extending through the apertures and downwardly below the sections, yielding means for pressing the sections upon the ground, and means for elevating the sections.

In testimony that I claim the foregoing as my own, I have hereto affixed my signature in the presence of two witnesses.

JOHN B. BUNTEN.

Witnesses:
 GRACE McKEVITT,
 E. J. WENNER.

---

Copies of this patent may be obtained for five cents each, by addressing the "Commissioner of Patents. Washington, D. C."